United States Patent [19]

Kinsler

[11] 4,148,460
[45] Apr. 10, 1979

[54] MULTI-PORT VALVE

[76] Inventor: James W. Kinsler, 3111 Middlebury, Birmingham, Mich. 48010

[21] Appl. No.: 778,375

[22] Filed: Mar. 17, 1977

[51] Int. Cl.² ............................................. F16K 3/32
[52] U.S. Cl. .................................. 251/206; 251/208; 251/185
[58] Field of Search ............... 251/206, 185, 208, 207, 251/625.15

[56] References Cited
U.S. PATENT DOCUMENTS

| 934,932 | 9/1909 | Osbourn | 251/206 |
|---|---|---|---|
| 2,219,504 | 10/1940 | Willis | 251/206 X |
| 2,497,139 | 2/1950 | Rumbaugh | 251/206X |
| 2,989,082 | 6/1961 | Ray | 251/185 X |
| 3,032,066 | 5/1962 | Smith | 251/185 X |
| 3,332,580 | 7/1967 | Spencer et al. | 251/185 X |
| 3,949,966 | 4/1976 | Fabish | 251/206 |

Primary Examiner—Arnold Rosenthal
Attorney, Agent, or Firm—Frank John Catalano

[57] ABSTRACT

A valve controls the rate of flow of fluid through its outlet pasage by selective alignment with the passage of a jet having an orifice of area less than that of the outlet passage. A plurality of jets in a single valve provides variable flow rate control and interchangeability of jets allows use of the same valve in a wide variety of applications and environs. The same valve can further be easily adapted for continuous or intermittant flow operation.

5 Claims, 3 Drawing Figures

MULTI-PORT VALVE

BACKGROUND OF THE INVENTION

This invention relates generally to valves and more particularly concerns valves of the multi-port type.

Valves presently used in applications for which this device is intended commonly employ a rotating cylinder having side wall apertures of varying diameters. As the cylinder is rotated, the diameter of the aperture aligned with the valve outlet determines the fluid flow rate. Though workable, these valves have several disadvantages.

For effective operation, the fluid flow path from the aperture to the outlet passage must be sealed. Sealing the curved, rotating, cylinder wall against the valve inside wall requires close tolerances. And even if achieved, wear in ordinary use will damage the seal.

Also, since the apertures are drilled in a single cylinder, wear or damage to a single aperture may necessitate replacement of the cylinder.

Furthermore, a single cylinder can only provide a limited number of flow rates in a single sequence. A desired change in one aperture would require a new cylinder, and a reasonable flexibility in rates and sequences could require a large number of cylinders.

This suggests an additional difficulty, the need for a different valve in changing from continuous to intermittant flow operation.

Accordingly, it is an object of the invention to provide a valve for controlling the rate of fluid flow through its outlet passage.

A further object of the invention is to provide a valve minimizing the adverse effects of ordinary wear on its component parts.

It is also an object of the invention to provide a valve having suitable flexibility in choices of flow rates and sequences.

Another object of the invention is to provide a valve readily adaptable for continuous or intermittant fluid flow operation.

SUMMARY OF THE INVENTION

In accordance with the invention a valve is provided having a chamber with a fluid inlet passage and a fluid outlet passage. A jet slideably disposed against the inner wall of the chamber containing the outlet passage has an orifice of area less than the area of the outlet passage. A member urges and guides the jet along the wall into and out of alignment with the outlet passage, thereby controlling the rate of fluid flow through the passage.

BRIEF DESCRIPTION OF THE DRAWINGS

Other objects and advantages of the invention will become apparent upon reading the following detailed description and upon reference to the drawings, in which.

While the invention will be described in connection with a preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
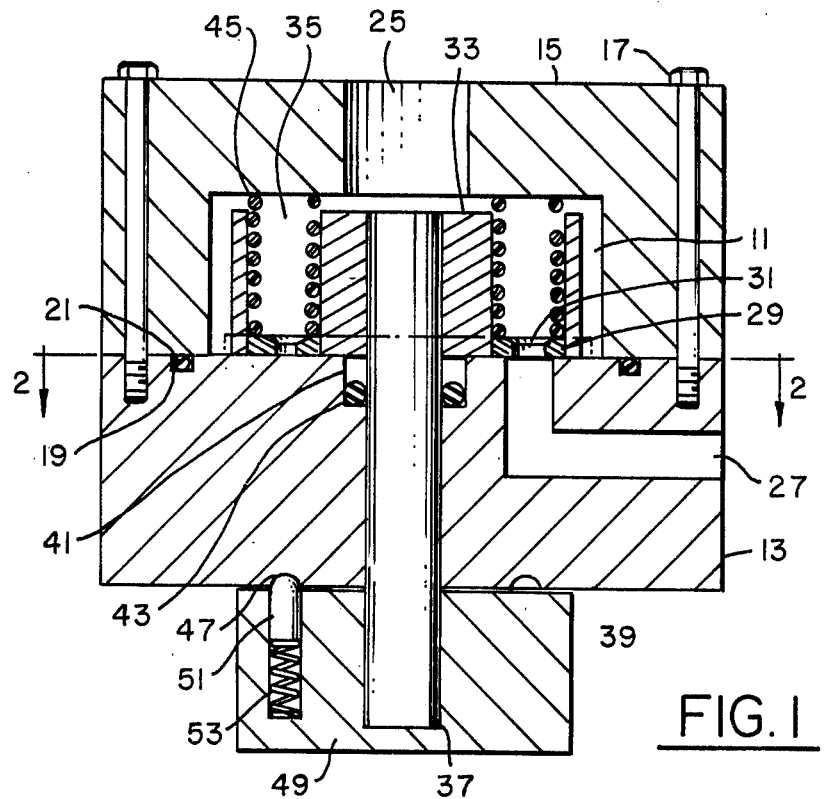
FIG. 1 is an exploded vertical section of the preferred embodiment of the invention for operation in the closed condition.
Figure 2:
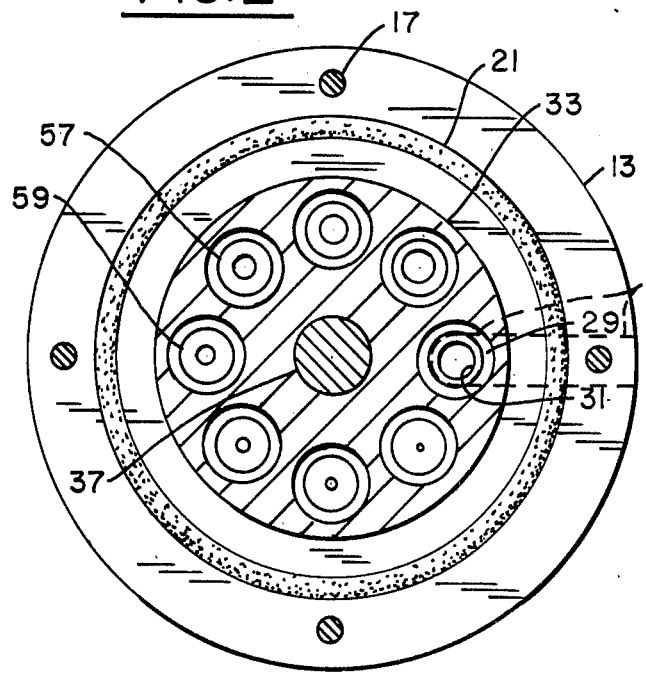
FIG. 2 is a fragmentary horizontal section taken along the line 2—2 in FIG. 1.

Turning first to FIGS. 1 and 2, a cylindrical chamber 11 is formed by a body 13 to which is attached a cover 15 by use of bolts 17. A channel 19 in the upper surface of the body 13 holds a compressible O-ring 21 in place to seal the junction of the cover 15 and the body 13 when the bolts 17 are tightened. Fluid is introduced to the chamber 11 through a fluid inlet passage 25 provided through the cover 15, and is removed through a fluid outlet passage 27, preferably extending from the upper surface of the body 13 through the side wall of the body 13. For purposes of this description, the area of the passage 27 at the upper surface of the body 13 will be presumed to be the smallest cross-sectional area of the passage 27, and will be referred to as the area of the passage 27.

To control the rate of flow of fluid through the outlet passage 27, one or more jets 29 is slideably disposed on the upper surface of the body 13. The jets 29 have a cross-sectional area larger than the area of the outlet passage 27 so that they will not fall into that passage 27. The jets 29 also have an orifice 31 of area generally less than the area of the passage 27, and in some applications it may be desireable that one or more of the jets 29 have an orifice 31 of zero area; that is, be completely closed. Thus, the rate of flow of fluid through the outlet passage 27 can be controlled by selective alignment of an appropriate jet 29 with the passage 27, and the rate can be varied from a maximum when an aligned orifice 31 is equal to or larger than the passage 27, to a minimum of no flow when an aligned orifice is completely closed. To accomplish the selection, means is provided for urging and guiding the jets 29 into and out of alignment with the passage 27. In the preferred embodiment of the valve, this means includes a cylindrical disc 33 of diameter such that, when its axis coincides with that of the cylindrical chamber 11, the disc 33 overlaps the outlet passage 27. The disc 33 has one or more sockets 35 extending through its length, ideally displaced at equal angular intervals and at a radius equal to the distance from the axis of the chamber 11 to the center of the outlet passage 27. The disc 33 is rotatively mounted on a shaft 37 extending through a bore 39 in the body 13. One of the jets 29 is disposed in each of the sockets 35, and as the disc 33 is rotated each of the jets can be moved into and out of alignment wih the outlet passage 27. In order to provide a suitable seal about the shaft 37, a seat 41 about the upper end of the bore 39 holds a second O-ring 43. The O-ring 43 snugly grips the shaft 37 and nestles against the walls of the seat 41 to prevent flow of fluid through the bore 39. When a selected jet 29 is aligned with the outlet passage 27, the pressure drop across the jet 29 during operation of the valve will maintain firm contact between the surfaces of the jet 29 and the body 13. Normal wear during use will improve this contact. Thus the only fluid flowing to the outlet passage 27 must pass through the jet orifice 31. Means may also be provided, however, to preposition the jet 29 against the body 13 prior to establishment of the pressure drop. For example, a resilient member such as a helical spring 45 can be compressed in each socket 35 between the body 13 and the cover 15.

Means is also provided for rotating the shaft 37 and disc 33 and for locating and securing selected jets 29 in alignment with the outlet passage 27. One or more recesses 47 are disposed in the lower surface of the body 13 on a circular path radially displaced from the shaft 37. The recesses 47 are also angularly displaced from each other to correspond with the angular displacement of the sockets 35 in the disc 33. A detent knob 49 secured to the lower end of the shaft 37 carries a detent 51 pressed against the lower surface of the body 13 by a compressed resilient member 53. The detent 51 is located to ride along the circular path of the recesses 47, and engagement of the detent with a recess 47 locates and secures a corresponding jet 29 in alignment with the outlet passage 27. Identification of the various valve positions can be made by use of any desireable switch plate arrangement.

As described thus far, the valve is of the intermittant flow or closed operation type. That is, the disc 33 will ride on the upper surface of the body 13 and therefore, when a jet orifice 31 is not at least in partial alignment with the outlet passage 27, the passage 27 is closed and the flow of fluid is terminated.

Figure 3:
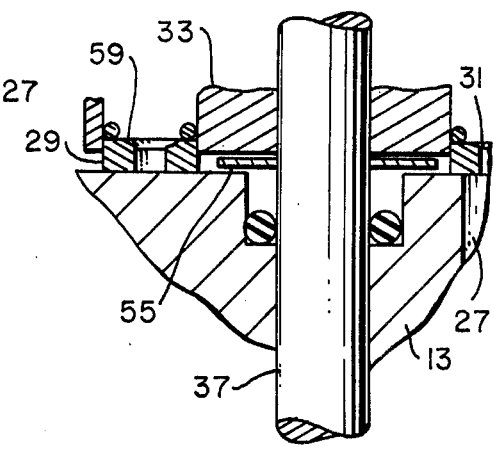
FIG. 3 is fragmentary vertical section of the preferred embodiment of the invention adapted to operate in the open condition.

The valve, however, may readily be adapted to provide for continuous flow or open operation. As shown in FIG. 3, means can be provided for spacing the disc 33 above the body 13, such as a washer 55. Thus, when neither of adjacent jets 57 and 59 have orifices aligned even partially with the outlet passage 27, fluid will flow from the inlet passage, not shown, around the disc 33, between the jets and into the outlet passage 27. The rate of fluid flow during continuous flow when no jet orifice 31 passes fluid to the outlet passage 27 can be controlled by the proper selection of the height of the spacing means, or alternatively by establishing a jet surface area of shape or dimension suitable to restrict flow to the passage 27.

In operation in the intermittant flow or closed condition, when a pressure drop occurs from the fluid inlet passage 25 to the fluid outlet passage 27, and when a jet orifice aligns with the passage 27, fluid will flow through the outlet pasage 27 at a rate determined by the area of the orifice 31 or the passage 27, whichever is smaller. To change the rate of flow the disc 33 is rotated to select a different jet orifice 31 having an area suited to produce the desired rate of flow. During rotation of the disc 33 which rides in abutment with the body 13, flow through the passage 27 will be terminated when no part of any orifice 31 is aligned with the outlet passage 27.

Operation in the continuous flow or open condition is similar, except that the spacing means insures that flow through the outlet passage 27 will continue even when no part of any orifice 31 is aligned with outlet passage 27.

The flexibility of this device is readily apparent. For example, given nine jets having orifices of different size, and a disc with eight sockets, nine different flow rate combinations are possible. If, in a given application, the sequence of rates is of concern, hundreds of thousands of sequences can be had with only nine jets. Each further available jet multiplies these possibilities.

Thus it is apparent that there has been provided, in accordance with the invention, a valve that fully satisfies the objects, aims and advantages set forth above. While the invention has been described with a specific embodiment thereof, it is evident that many alternatives will be apparent to those skilled in the art. It is intended to embrace all such alternatives in the appended claims.

What is claimed is:

1. A valve comprising:
   a cylindrical chamber having a fluid inlet passage and a fluid outlet passage, said outlet passage being in an end wall of and displaced from the axis of said chamber;
   a cylindrical member disposed in said chamber for rotation about the axis of said chamber, said member having a plurality of sockets extending therethrough, said sockets being angularly displaced along a circular path equally displaced as said outlet passage from said axis;
   a plurality of jets, one disposed in each of said sockets and against said end wall of said chamber for rotation with said member into and out of alignment with said outlet passage, each of said jets having an orifice therethrough of area less than the area of said outlet passage whereby fluid flow through said outlet passage may be restricted; and
   means for spacing said member from the chamber wall containing said outlet passage, whereby fluid flow through said outlet passage continues when none of said orifices is aligned with said outlet passage.

2. The valve according to claim 1, said orifices having areas of varied predetermined sizes, said valve further comprising means for locating and securing any selected one of said jets in alignment with said outlet passage.

3. The valve according to claim 1, the angular displacement between said sockets and the areas of said orifices and said outlet passage being such as to prevent flow of fluid through more than one of said orifices to said outlet passage at the same time.

4. The valve according to claim 1 further comprising means for prepositioning said jets firmly against said chamber wall prior to flow of fluid through said jets.

5. The valve according to claim 1, said spacing means providing a gap between said member and said chamber wall of dimension predetermined to restrict the continuous flow of fluid through said outlet passage.

* * * * *